US011841977B2

(12) United States Patent
Goldsteen et al.

(10) Patent No.: US 11,841,977 B2
(45) Date of Patent: Dec. 12, 2023

(54) TRAINING ANONYMIZED MACHINE LEARNING MODELS VIA GENERALIZED DATA GENERATED USING RECEIVED TRAINED MACHINE LEARNING MODELS

(71) Applicant: International Business Machines Corporation, Armonk, NY (US)

(72) Inventors: Abigail Goldsteen, Haifa (IL); Ariel Farkash, Shimshit (IL); Micha Gideon Moffie, Zichron Yaakov (IL); Gilad Ezov, Nesher (IL); Ron Shmelkin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 17/173,628

(22) Filed: Feb. 11, 2021

(65) Prior Publication Data

US 2022/0253554 A1    Aug. 11, 2022

(51) Int. Cl.
*G06F 21/62* (2013.01)
*G06N 20/00* (2019.01)
*G06F 18/214* (2023.01)

(52) U.S. Cl.
CPC ...... *G06F 21/6254* (2013.01); *G06F 18/2148* (2023.01); *G06F 18/2155* (2023.01); *G06N 20/00* (2019.01)

(58) Field of Classification Search
CPC .... G06F 21/6254; G06N 20/00; G06N 3/088; G06N 5/01
See application file for complete search history.

(56) References Cited

U.S. PATENT DOCUMENTS

| 8,966,649 | B2 | 2/2015 | Stack et al. |
| 11,449,639 | B2* | 9/2022 | Bernau ................. G06N 3/047 |
| 2019/0260784 | A1 | 8/2019 | Stockdale et al. |
| 2021/0042629 | A1 | 2/2021 | Ezov et al. |
| 2022/0129771 | A1* | 4/2022 | Horesh ............... H04L 67/1057 |

FOREIGN PATENT DOCUMENTS

| CN | 106339714 A | 1/2017 |
| WO | 2017222902 A1 | 12/2017 |

OTHER PUBLICATIONS

Brickell, Justin et al., "The Cost of Privacy: Destruction of Data-Mining Utility in Anonymized Data Publishing", Proceedings of the 14th ACM SIGKDD International Conference on Knowledge discovery and data mining, Aug. 2008, 9 pages.
Chen, Rui et al., "Privacy-preserving trajectory data publishing by local suppression", Information Sciences, vol. 231, Apr. 2010, 38 pages.

(Continued)

*Primary Examiner* — Olugbenga O Idowu
(74) *Attorney, Agent, or Firm* — Barry D. Blount (57) ABSTRACT

An example system includes a processor to receive training data and predictions on the training data of a trained machine learning model to be anonymized. The processor is to generate generalized data from training data based on the predictions of the trained machine learning model on the training data. The processor is to train an anonymized machine learning model using the generalized data.

20 Claims, 7 Drawing Sheets

(56) References Cited

OTHER PUBLICATIONS

Choudhury, Olivia et al., "Anonymizing Data for Privacy-Preserving Federated Learning", 24th European Conference on Artificial Intelligence, Feb. 21, 2020, 9 pages.

Ghinita, Gabriel et al., "Fast Data Anonymization with Low Information Loss", VLDB '07, Proceedings of the 33rd International Conference on Very Large Data Bases, Sep. 23-28, 2007, 12 pages.

Goldsteen, Abigail et al., "Anonymizing Machine Learning Models", eprint arXiv:2007.13086, Jul. 26, 2020, 11 pages.

Goldsteen, Abigail et al., "Data Minimization for GDPR Compliance in Machine Learning Models", arXiv—CS—Machine Learning, Aug. 6, 2020, 16 pages.

Hajian, Sara et al., "Generalization-based privacy preservation and discrimination prevention in data publishing and mining" Data Mining and Knowledge Discovery, Sep. 2014, 28 pages.

Inan, Ali et al., "Using Anonymized Data for Classification", IEEE International Conference on Data Engineering, Apr. 10, 2009, 12 pages.

Iyengar, Vijay S. et al., "Transforming Data to Satisfy Privacy Constraints" Proceedings of the ACM, SIGKDD International Conference on Knowledge Discovery and Data Mining, Aug. 2002, 10 pages.

LeFevre, Kristen et al., "Incognito: efficient full-domain K-anonymity", In Proceedings of the 2005 ACM SIGMOD international conference on Management of data, Jun. 2005, 12 pages.

LeFevre, Kristen et al., "Mondrian Multidimensional K-Anonymity". Published in: 22nd International Conference on Data Engineering, Apr. 24, 2006, 11 pages.

Lefevre, Kristen et al., "Workload-Aware Anonymization Techniques for Large-Scale Datasets", ACM Transactions on Database Systems, Sep. 2008, 47 pages.

Malle, Bernd et al., "The Right to be Forgotten: Towards Machine Learning on Perturbed Knowledge Bases," International Conference on Availability, Reliability, and Security, Aug. 23, 2016, 17 pages.

Abadi, Martin et al., "Deep Learning with Differential Privacy", Proceedings of the 2016 ACM SIGSAC Conference on Computer and Communications Security, Oct. 24, 2016, 14 pages.

Papernot, Nicholas et al., "Semi-supervised Knowledge Transfer for Deep Learning from Private Training Data", ICLR 17, Mar. 3, 2017, 16 pages.

Zhang, Tianwei et al., "Privacy-preserving Machine Learning through Data Obfuscation", eprint arXiv:1807.01860, Jul. 13, 2018, 12 pages.

\* cited by examiner

TRAINING ANONYMIZED MACHINE LEARNING MODELS VIA GENERALIZED DATA GENERATED USING RECEIVED TRAINED MACHINE LEARNING MODELS

BACKGROUND

The present techniques relate to anonymizing machine learning models. More specifically, the techniques relate to anonymizing machine learning models using anonymized data sets. Machine learning models are often trained using user information in order to provide services and products. However, the trained machine learning models can also be used to derive the information that the machine learning models were trained on. For example, membership inference and attribute inference attacks may use machine learning models to reveal personal information. Some methods of anonymizing the machine learning models to prevent such attacks may change the training process itself in order to anonymize models. However, changing the training process may be a difficult and model-specific process. For example, in many cases, a new specific algorithm containing a privacy preserving characteristic may need to be used for each different model to be anonymized. In addition, learning on data anonymized in a generic manner may typically result in significant degradation in accuracy of the anonymized machine learning models, especially with large values of k and number of quasi-identifiers. Thus, existing methods either lose a lot of accuracy in the new retrained model, or may require completely replacing the training process used to train the original model with a new training process.

SUMMARY

According to an embodiment described herein, a system can include processor to receive training data and predictions on the training data of a trained machine learning model to be anonymized. The processor can also further generate generalized data based on the predictions of the trained machine learning model on the training data. The processor can also train an anonymized machine learning model using the generalized data. The system may thus enable anonymized machine learning model with respect to one or more quasi-identifiers. Optionally, the processor can generate an anonymizer model based on the predictions of the trained machine learning model on the training data and generate the generalized data from the training data using the anonymizer model. In this embodiment, by using predictions from the trained machine learning model, the system can enable the use of training data that is not the same as the training data used to train the trained machine learning model. In various embodiments, the generalized data comprises representative values in the same domain as original features used to train the anonymized machine learning model. In these embodiments, the resulting anonymized machine learning model may be functionally similar to the trained machine learning model and thus preserve efforts into training the trained machine learning model. Optionally, the training data comprises unlabeled data and the processor is to label the unlabeled data based on the predictions of the trained machine learning model. In this embodiment, the system can generate an anonymized model without the original labels used to train the trained machine learning model. Optionally, the predictions comprise outputs from a layer of the trained machine learning model that is prior to a final classification layer. In this embodiment, the system may result in an anonymized machine learning model that is more accurate in classifying input data. Optionally, the trained machine learning model comprises a complex model, and the anonymized machine learning model comprises an anonymized part of the complex model. In this embodiment, the system can be used to train more complex machine learning models.

According to another embodiment described herein, a method can include receiving, via a processor, training data and predictions on the training data of a trained machine learning model to be anonymized. The method can further include generating, via the processor, an anonymizer model based on the predictions of the trained machine learning model on the training data. The method can also further include anonymizing, via the processor, the training data via the anonymizer model to generate generalized data. The method can also include retraining, via the processor, the trained machine learning model using the generalized data to generate an anonymized machine learning model. The method may thus enable an anonymized machine learning model with respect to one or more quasi-identifiers. Optionally, generating the anonymizer model comprises training a decision tree using predictions of the trained machine learning model. In this embodiment, the method can automatically determine groups used to anonymize the training data. Optionally, generating the anonymizer model comprises using a two phase clustering algorithm comprising a coarse clustering phase and a sub-clustering phase. In this embodiment, the method can similarly automatically identify groups used to anonymize the training data. Optionally, generating the anonymizer model comprises using the predictions of the trained machine learning model on the training data as input to generate groups of similar records and generalizing the groups to generate the anonymizer model. In this embodiment, by using predictions from the trained machine learning model, the method can enable the use of training data that is not the same as the training data used to train the trained machine learning model. Optionally, anonymizing the training data comprises replacing data points in each cluster or bucket of similar inputs with a representative value for the cluster or the bucket. In this embodiment, no mapping of new data is needed during runtime since the representative value is within the same domain of the original trained machine learning model. Optionally, retraining the trained machine learning model comprises retraining parts of the trained machine learning model, where the trained machine learning model comprises a complex model. In this embodiment, the method can be used to train more complex machine learning models. Optionally, the training data that is generalized for creating the anonymized machine learning model is different from the training data used to train the trained machine learning model. In this embodiment, the method can enable anonymization of machine learning models without possession of the original machine learning training data.

According to another embodiment described herein, a computer program product for anonymizing machine learning models can include computer-readable storage medium having program code embodied therewith. The computer readable storage medium is not a transitory signal per se. The program code executable by a processor to cause the processor to receive training data and predictions on the training data of a trained machine learning model to be anonymized. The program code can also cause the processor to generate an anonymizer model based on the predictions of the trained machine learning model on the training data. The program code can also cause the processor to anonymize the training data via the anonymizer model to generate generalized data. The program code can also cause the processor to retrain the trained machine learning model using the generalized data to generate an anonymized machine learning model. The computer program product may thus enable an anonymized machine learning model with respect to one or more quasi-identifiers. Optionally, similar embodiments with similar benefits may be used as in the example method above.

DETAILED DESCRIPTION

K-anonymity is a method to reduce the likelihood of any single person being identified within a dataset when the dataset is linked with other, external data sources. The approach is based on generalizing attributes, and possibly deleting records, until each record becomes indistinguishable from at least k−1 other records. K-anonymity algorithms iteratively choose features from the dataset to generalize to enable grouping together several similar data records. In some examples, a generalized feature may be a less accurate representation. In various examples, the features for a group of records may thus be generalized using a range for numerical features, or a sub-group for categorical features, that covers all records in the group. For example, a generalized feature may be a location rounded to 3 digits after the decimal point. In some examples, a generalized feature may also be a range instead of an exact value. For example, a generalized feature may be a 5-year age range instead of individual years. For example, given three records with the age values 31, 32 and 35, these records can be generalized to the age range 31-35. In various examples, a generalized feature may include a set of categories or a high-level category instead of a single or specific value. For example, a high-level category may be the use of "healthcare professional" instead of "doctor" or "nurse". Similarly, if these three records have the occupation values "nurse", "teacher", and "engineer", then these can be generalized to the group ["nurse", "teacher", "engineer"]. In various examples, a generalized feature may include a representative value that replaces an exact value. The representative value can be chosen as the median of a range of values, or as any other value that falls within the range or category group. For example, given three records with the age values 31, 32 and 35, these records can be generalized to the single value 33.

In various examples, features may be generalized gradually, either one by one or all together, until the goal of k-anonymity is achieved. All records may be grouped in buckets of at least size k when k-anonymity is achieved. As used herein, a bucket refers to a group of records that will be generalized together to the same set of generalized features. The generalized features are then extracted from the data in each bucket. For example, for each feature, the set of all values in each bucket (for categorical features) or a range that includes all values in the bucket, is chosen. For example, if a bucket contains three records with the age values 31, 32 and 35 and the occupation values "nurse", "teacher", and "engineer", the age feature can be generalized to the range 31-35 and the occupation feature can be generalized to the group ["nurse", "teacher", "engineer"]. Alternatively, the age feature can be generalized to the representative value 33 and the occupation feature can be generalized to the value "teacher".

At the end of the process, the utility of the data can be measured to determine how far away the utility is from the original dataset. For example, the distance may be measured by calculating the entropy or other loss measures.

According to embodiments of the present disclosure, a processor can receive a trained machine learning model to be anonymized and training data. The processor can generate generalized data based on predictions of the trained machine learning model generated from the training data. For example, the processor can generate an anonymizer model based on predictions of trained machine learning model on the training data. The processor can then anonymize the training data via the anonymizer model to generate generalized data. The processor can then retrain the trained machine learning model using the generalized data to generate an anonymized machine learning model. The present embodiments thus use the information coded in the received machine learning model to guide the creation of buckets of similar records as a basis for an anonymization process, thus resulting in an anonymization that is more tailored to the specific analysis being performed. As opposed to some anonymization methods, the input to the embodiments described herein includes training data, which may be unlabeled, and a trained ML model that may be trained on a different training set. This means that it can also be applied to retrofit pre-existing trained models for which the original, labeled dataset is no longer available but another, unlabeled dataset can be used. The result is a new trained ML model that is based on the anonymized training data. Thus, embodiments of the present disclosure provide techniques that are agnostic to any specific model to be anonymized. The embodiments may therefore be used with a variety of specific machine learning models. In addition, the embodiments are non-invasive. Thus, the various algorithms used to generate the underlying machine learning model, which may include choice of model type, architecture, pre-processing, feature engineering and selection, hyper-parameter tuning, and training algorithms, are not impacted by the various embodiments described herein. By replacing groups with representative values, the embodiments also avoid the need to perform any mapping of user data to new types of data, such as ranges or groups, at runtime. The embodiments enable generation of an anonymized data set that minimally impacts the accuracy of anonymized machine learning models trained using the anonymized data set. For example, the embodiments enable anonymization when employing complex machine learning models with high initial accuracy, using large values of k and large numbers of quasi-identifiers. As used herein, quasi-identifiers refers to pieces of information that are not of themselves unique identifiers, but may, when combined with other quasi-identifiers or with other pieces of data external to the dataset, create a unique identifier. Thus, anonymized machine learning models trained on the anonymized data sets described herein provide stronger privacy and protection against attacks, such as membership attacks, while preserving the original characteristics of the machine learning model and with minimal adverse effects on accuracy. Moreover, the present embodiments can even defend against other classes of attacks such as attribute inference attacks. The embodiments are also able to achieve similar results in their ability to prevent membership inference attacks as alternative approaches based on differential privacy, while being much less complex and resource-intensive. Furthermore, the embodiments herein do not assume the availability of similar public datasets, and do not assume any control over the training process. The embodiments herein are thus well suited for scenarios where a private data owner may not possess enough local resources to perform the training of the final model. For example, external parties, such as a machine learning-as-a-service, may perform the training on the anonymized dataset, as described in embodiments herein.

Figure 1:
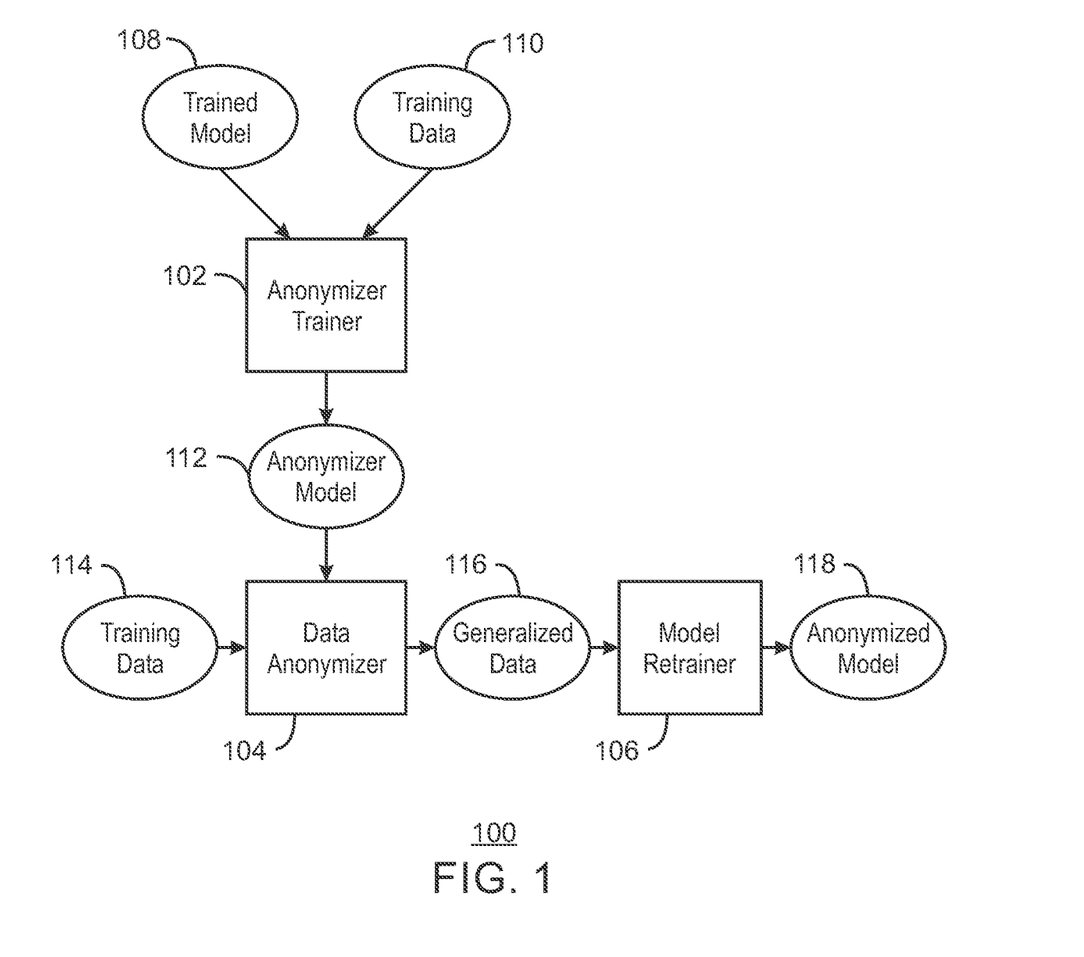
FIG. 1 is a block diagram of an example system for anonymizing machine learning models.

With reference now to FIG. 1, a block diagram shows an example system for anonymizing machine learning models. The example system 100 of FIG. 1 includes an anonymizer model trainer 102 communicatively coupled to a data anonymizer 104. The system 100 also includes a model retrainer 106 communicatively coupled to the data anonymizer 104. The system 100 includes a trained model 108 and training data 110 shown being received at the anonymizer model trainer 102. The trained model 108 may be the model whose accuracy the anonymizer model trainer 102 can try to preserve while anonymizing. For example, the trained model 108 may be a machine learning model, an artificial neural network (ANN) model such as Convolutional Neural Network (CNN), Recurrent Neural Network (RNN), a Deep Neural Network (DNN) model, a state vector machine (SVM), a decision tree, or the like. In various examples, the trained model 108 may be a part of a more complex machine learning model. The complex machine learning model may be composed of sub-models or parts. The trained model 108 may be one of these sub-models or parts, and used to guide the anonymization process of the sub-model or part. For example, the trained model 108 may be the embedding layers of a more complex model, a transfer learning model, or a model for a task in a multi-task model. In various examples, the training data 110 may be raw training data. In some examples, the training data 110 may not have any labels. For example, such labels may have been used to train the trained model 108, but be unavailable to the anonymizer trainer 102. The system 100 also further includes an anonymizer model 112 shown being generated by the anonymizer model trainer 102 and received by the data anonymizer 104. The system 100 also includes training data 114. For example, the training data 114 may be non-anonymized data to be used for retraining the trained model 108. In various examples, the training data 114 may be data taken from training data 110. In other examples, the training data 114 may be data with similar information as, but not from, training data 110. The system 100 also includes generalized data 116 generated by the data anonymizer 104 and received by the model retrainer 106. For example, the generalized data 116 may be anonymized using the techniques described herein. The system 100 also further includes an anonymized model 118 shown being generated by the model retrainer 106. For example, the anonymized model 118 may be the same type of model as the trained model 108.

In the example of FIG. 1, the system 100 may generally execute an accuracy-guided anonymization process that starts with receiving an initial trained model 108 trained on training data 110. For example, the anonymization process executed may be the method 200 of FIG. 2. In various examples, the training data 110 along with the predictions of the trained model 108 on the training data 110 may be used as input to guide the anonymization process and thus preserve accuracy of the anonymized model 118. In some examples, the anonymizer trainer 102 may use the predictions of the trained model 108 to guide the creation of groups of similar records to generalize together. For example, the system 100 may generally anonymize the training data 114 based on identifying groups of inputs that generate similar decisions from the trained model 108 and use those groups as a basis for the anonymization process by mapping each group to a single representative value. The system 100 may then create an anonymized training set specially tailored for that model, referred to herein as generalized data 116. For example, the generalized data 116 may have all inputs of each of the groups replaced with corresponding representative values. The system 100 can then create an anonymized version of the machine learning model 108, referred to herein the anonymized model 118. For example, the trained model 108 is retrained on the generalized data 106 to yield an anonymized model 118.

In various examples, the anonymizer trainer 102 may generate a generalization referred to herein as an anonymizer model 112. For example, the generalization may include groups of inputs that are mapped to representative values. Thus, the anonymizer model 112 is tailored to the specific trained model 108 to be retrained and anonymized. In various examples, the anonymizer trainer 102 may train the anonymizer model 112 on the training data 110 using the output predictions of the original trained model 108 as labels for the training data 110. For example, the anonymizer trainer 102 may train an anonymizer model 112 using the predictions to learn the decision boundaries of the target trained model 108. In this manner, the anonymizer trainer 102 may group inputs together such that their outputs are as homogenous as possible. In various examples, this training may be similar to student-teacher training or the knowledge distillation concept sometimes employed as a means for model compression. For example, a new (student) model may be trying to learn from, or mimic, an original (teacher) model, but in a slightly different manner than the original model was trained. As one example, the new model may be using a different model type, architecture, or training set. In some examples, the initial trained model 108 used to generate these predictions may be a simple representative model. For example, a simple representative model may be used when full model training is performed by a third party. In some examples, the initial trained model 108 may be trained by a data owner on a subset of the training data 110. Alternatively, the trained model 108 may be a pre-trained model performing a similar classification task as a target model that is being sought to be anonymized. In any case, the anonymizer trainer 102 may identify groups of inputs based on outputs of the trained machine learning model 108. For example, the anonymizer trainer 102 may generate the groups of similar inputs by creating buckets of similar inputs using decision trees or using a clustering technique.

In some examples, the anonymizer trainer 102 may create buckets of similar inputs using a decision tree. For example, the anonymizer trainer 102 may take the classifications made by the original trained model 108 and try to learn its decision boundaries using the decision tree. As one example, the decision boundaries may indicate how the multi-dimensional space is partitioned into the different classes. The anonymizer trainer 102 may train the decision tree to learn the predictions made by the original model 108. In various examples, the anonymizer trainer 102 may create leaf nodes with at least k samples, and then use the leaf nodes of the tree as similar groups of k inputs. In some examples, the anonymizer trainer 102 may generate the decision tree with splits generated based on information gain with regard to the learning target. In some examples, the anonymizer trainer 102 may generate the decision tree based on Gini impurity. During the training process, the anonymizer trainer 102 may set the minimum number of samples to be used in each leaf node of the tree to k. For example, the anonymizer trainer 102 may also receive a value for k as an input outside parameter. A higher value of k may generally provide greater privacy. In addition, the anonymizer trainer 102 may receive a list of quasi-identifiers. A larger number of quasi-identifiers may also generally provide more privacy. However, an increased k or number of quasi-identifiers also entails higher data loss due to a greater amount of generalization. The data anonymizer 104 may then use the leaves of the decision tree as the basis for generalization. In various examples, the group of training samples mapped to each leaf is the group of at least k similar records that are mapped together to the same generalized value. The data anonymizer 104 may then generalize all of those samples in the same manner. The generalized samples may be indistinguishable from each other on the quasi-identifiers and thus satisfy k-anonymity with respect to the quasi-identifiers because each leaf node may contain at least k samples from the training set.

In some examples, the anonymizer trainer 102 may alternatively generate buckets of similar inputs using a two-phase clustering. In various examples, the two-phase clustering may include a coarse-clustering phase and a sub-clustering phase. In some examples, the anonymizer trainer 102 may use a two-phase clustering when a decision tree is not capable of closely mimicking the behavior of the original trained model 108. For example, a decision tree may not be capable of closely mimicking the behavior of the trained model 108 if the trained model 108 is a highly non-linear model or a very deep neural network.

In the coarse-clustering phase, the anonymizer trainer 102 can generate a coarse clustering of the training data 110. In general, the coarse-clustering phase may include identifying groups of inputs that generate similar decisions from the trained model and using those groups as a basis for feature generalization. As one example, the anonymizer trainer 102 can use t-distributed stochastic neighbor embedding (t-SNE) to perform coarse-clustering. T-SNE enables clustering neural network inputs based on the feature vector generated by the last hidden layer in the neural network. For example, the last hidden layer may be the layer before the final output layer of the neural network. T-SNE can also be used for visualizing neural network decisions by reducing the feature vector to a small number of dimensions that can be plotted in a graph or table. In various examples, the anonymizer trainer 102 can use t-SNE to generate buckets of inputs that generate similar classification results. For example, the buckets may be generated based on the t-SNE values generated for the inputs. A technical benefit of using t-SNE is increased accuracy of the anonymized model 118 when trained using generalized data 116 generated using t-SNE.

In some examples, the anonymizer trainer 102 can alternatively perform coarse-clustering using the model classifications or predictions as the buckets to generalize from. For example, the anonymizer trainer 102 can detect inputs that yield the same classification as similar and group similar inputs together. As one example, the inputs may be grouped into three groups based on the output of one of three classes of the trained machine learning model.

In various examples, the anonymizer trainer 102 can perform the sub-clustering phase once a set of buckets of inputs with similar outputs is generated using the coarse clustering phase. For example, the anonymizer trainer 102 can generate sub-clusters within each such bucket that are similar in the input space to create a k-anonymous dataset that will have the least harmful effect on the accuracy of the anonymized model 118. In some examples, the anonymizer trainer 102 can apply any suitable clustering technique on each bucket found in the coarse-clustering phase. However, in the sub-clustering phase, the anonymizer trainer 102 may perform clustering on the input vectors of attributes or features instead of the output classes or the output of the last hidden layer. For example, the anonymizer trainer 102 may use input attributes if the model is a simple model, or input features that are output from another part of a more complex model. Thus, the sub-clustering phase may use features not considered by the coarse clustering phase. The sub-clustering phase may yield sub-classes that are close in the input domain and easier to generalize. In various examples, the anonymizer trainer 102 may generate clusters of at least size k in the sub-clustering phase. In some examples, the anonymizer trainer 102 may alternatively apply any known k-anonymity algorithm on the data inside of each initial bucket. For example, for each bucket with more than 2(k) records, the anonymizer trainer 102 may run k-anonymity on the data within the bucket to generate groups of at least k records. In some examples, the anonymizer trainer 102 can merge any bucket with less than k records with another bucket. In some examples, if there is a distance metric defined between the class labels, then the anonymizer trainer 102 may merge a bucket with another bucket of the closest class. In some examples, if there is more than one bucket with less than k records, then the anonymizer trainer 102 may merge the buckets with each other. Otherwise, in other examples, a bucket may be merged with another bucket that is chosen at random. In various examples, the buckets may be merged into one bucket with a resulting range of input values that is larger in size. In various examples, the bucket with less than k records may be merged with the smallest other group that results in a group with at least k records. The result may be a generated set of buckets of similar inputs.

In various examples, the anonymizer trainer 102 may then map the ranges or sub-groups of each bucket to a numerical feature on which the anonymized model 118 can be trained. In some examples, the anonymizer trainer 102 may select a representative point for each cluster and map all data points in the cluster to that representative point to generate the anonymizer model 112. In various examples, the anonymizer trainer 102 may use one of several methods for mapping the data points in each leaf or cluster to a representative value. In various examples, the numerical features may be the mean or median values of each of the ranges or some median value of a cluster. For example, the anonymizer trainer 102 may take the mean of each feature, or a representative point within the cluster that is closest to the cluster median. In some examples, the anonymizer trainer 102 can choose the centroid of the cluster. For example, the anonymizer trainer 102 can choose the centroid by finding a vector that contains one number for each variable, where each number is the mean of a variable for the observations in that cluster. In some examples, the anonymizer trainer 102 can choose the median value of each feature. In other examples, the anonymizer trainer 102 may use random sampling from the distribution of each cluster. In some examples, the anonymizer trainer 102 can choose an actual value that falls in the cluster as the representative point for that cluster. One technical effect of using actual values as representative points is higher prediction accuracy, because using representative points may result in records that are more realistic with regard to the original training data 110.

In various examples, the anonymizer trainer 102 can one-hot encode the categorical features such that all features are numeric. In some examples, the anonymizer trainer 102 can then use the point closest to the median of the cluster from the points with the majority label in that cluster. By mapping all records belonging to the same leaf node to the same concrete value, k-anonymity may be satisfied. One technical benefit of mapping of the records to concrete values is that such mapping enables using the anonymized model 118 directly on any newly collected test data, without having to apply any special recoding dictated by the anonymization process. Thus, another technical benefit is that the rest of the machine learning lifecycle may remain unchanged. The anonymizer trainer 102 may thus generate an anonymizer model 112 that maps each sample of the training data 114 to a concrete, representative point in the domain of the original features of the original trained machine learning model 108.

In various examples, the data anonymizer 104 may then replace all mapped data points in the training data 114 with the representative points in the anonymizer model 112 to generate the generalized data 116. The resulting generalized data 116 satisfies k-anonymity since each group of at least k records is indistinguishable from each other on the quasi-identifiers because the values for the quasi-identifiers in the group are all mapped to the same representative points. In various examples, the anonymized records of the generalized data 116 may thus also have the same domain as the original training data 110. In this manner, the data anonymizer 104 can k-anonymize the training data 114 using the anonymizer model 112 to generate generalized data 116.

As one example, the anonymization process may be executed using a decision tree via the following example pseudocode:
   Inputs: training data X labeled with original model's predictions y, list of quasi-identifiers QI, and required k value
   Output: anonymized training data X
   Separate X into $X_{qi}$ (only QI features) and $X_{rest}$ (rest of features)
   Train decision tree T on ($X_{qi}$, y) with min_samples_leaf=k
   for each leaf node 1 in T:
      S←samples in 1
      m←median(S)
      s←sample closest to m (using Euclidean distance)
      S'←replace all samples in S with s
   X'←∪S'
   Re-attach X' with $X_{rest}$→$\overline{X}$ In various examples, the model trainer 106 can then retrain the trained model 108 on the anonymized generalized data 116. As one technical benefit, the resulting anonymized model 118 can be shared, sold and stored freely. As another technical benefit, the anonymized model 118 may have the same usability and functionality as the original trained model 108 for any new input test values. For example, no mapping to any new domains would need to be performed at runtime because the original ranges and generalizations were mapped to data points within the original domain of the trained model 108.

In various examples, the model trainer 106 may be used to retrain a part or sub-model of a more complex model. As one example, in the context of transfer learning, a first part of a complex transfer learning model may be trained on a first data set, and the last few layers may be fine-tuned on a second data set. In some examples, the first data set, the second data set, or both, may include information to be anonymized. The data anonymizer 104 may anonymize the first data set or second data set, or both, to generate generalized data 116 used to retrain the complex model accordingly.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional models, data, or additional anonymizer trainers, data anonymizers, model retrainers, etc.). For example, the system 100 may not include a trained model 108. In some examples, if no pre-existing or minimally trained model 108 is available, then the anonymizer trainer 102 may use target class labels instead of model predictions. In various examples, the system 100 can also additionally include a feature selector to apply a feature selection that chooses the most influential features for the desired model. For example, if there are features that are determined not to be needed, then the feature selector may remove such features from consideration. However, there are also technical advantages to the system 100 with-out any prior feature selection, as described in FIG. 1. For example, there are some models in which feature selection is not typically applied, such as neural networks. The system 100 may therefore be more compatible with various machine learning models without any feature selection. In addition, when performing feature selection blindly without any additional information about which features are considered quasi-identifiers, the feature selection process may inadvertently select quasi-identifiers as important features, even if other features could have been used instead. This may be the case in datasets where some redundancy between features exists. In some examples, the system 100 may therefore first apply anonymization to the quasi-identifiers and then perform feature selection, allowing features that have not been anonymized to be selected. In addition, although the examples provided are mainly based on artificial neural networks, the techniques are general and can be performed for any machine learning model, framework, or implementation. For example, the techniques may also be performed using state vector machine (SVM), a decision tree, random forest, gradient boosting models, or logistic regression, etc.

Figure 2:
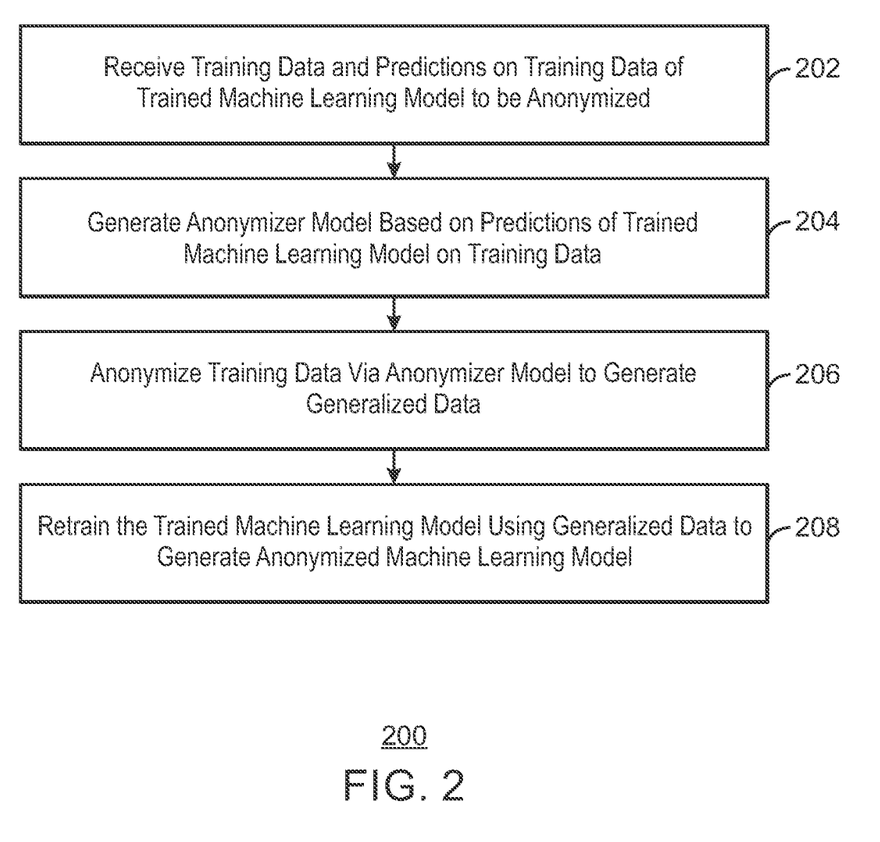
FIG. 2 is a block diagram of an example method that can anonymize machine learning models.

FIG. 2 is a process flow diagram of an example method that can anonymize machine learning models. The method 200 can be implemented with any suitable computing device, such as the computing device 400 of FIG. 4 and is described with reference to the system 100 of FIG. 1. For example, the methods described below can be implemented by the processor 402 of the computing device 400 of FIG. 4.

At block 202, training data and predictions on the data of a trained machine learning model to be anonymized are received. In some examples, a trained machine learning model to be anonymized and training data is received. For example, the machine learning model may be an ANN model, such as a CNN, RNN, or DNN model. In various examples, the training data may be labeled or unlabeled. In various examples, the predictions may be generated using the trained machine learning model on the training data. In some examples, the training data may be different than was used to train the machine learning model.

At block 204, an anonymizer model is generated based on predictions of trained machine learning model on the training data. In various examples, the predictions of the trained machine learning model on the training data are used as input to generate groups of k similar records and generalize the groups to generate the anonymizer model. For example, a decision tree may be trained using predictions of the trained machine learning model. In some examples, a two phase clustering including a coarse clustering phase and a sub-clustering phase may be executed. In some examples, the training data may be labeled based on the predictions of the trained machine learning model in response to detecting that the training data does not include labels.

At block 206, the training data is anonymized via the anonymizer model to generate generalized data. For example, data points in each cluster or bucket of similar inputs may be replaced with a representative value for the cluster or the bucket. In some examples, the training data that is generalized for creating the anonymized machine learning model is different from the training data used to train the trained machine learning model.

At block 208, the trained machine learning model is retrained using the generalized data to generate an anonymized machine learning model. For example, one or more parameters of the machine learning model may be recomputed based on training on the generalized data. As one example, the machine learning model is retrained using stochastic gradient descent or any other suitable training methods.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
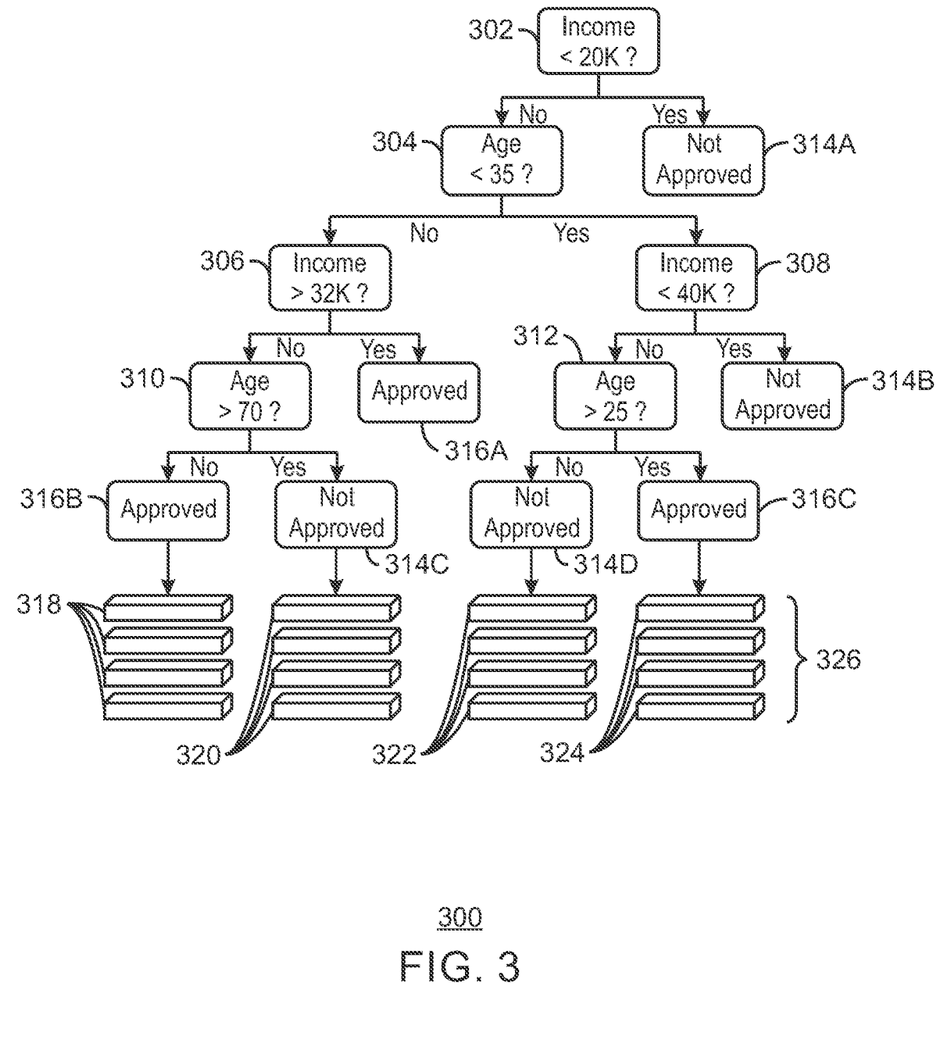
FIG. 3 is a block diagram of an example decision tree used for anonymizing machine learning models.

FIG. 3 is a block diagram of an example decision tree used for anonymizing machine learning models. The decision tree 300 can be implemented with any suitable computing device, such as the computing device 300 of FIG. 3 and is described with reference to the system 100 of FIG. 1. For example, the methods described below can be implemented by the computing device 400 of FIG. 4.

The example decision tree 300 of FIG. 3 includes a top level condition 302. The top level condition in the example of FIG. 3 is income of under $20,000. The decision tree 300 includes a condition 304 coupled to top level condition 302. The condition 304 of FIG. 3 is an age under 35. The decision tree 300 further includes condition 306 of an income above $32,000, and condition 308 of an income level under $40,000 both coupled to condition 304. The decision tree 300 further includes condition 310 of an age above 70 coupled to condition 306 and a condition of an age above 25 coupled to condition 308. The decision tree 300 also further includes various leaves including leaves 314A, 314B, 314C, and 314D indicating an individual was not approved, and leaves 316A, 316B, 316C indicating an individual is approved. The decision tree 300 also includes similarity groups 318, 320, 322, and 324 each having a k value 326 of four in the example of FIG. 3 and coupled to leaves 316B, 314C, 314D, and 316C, respectively. Although not shown for sake of clarity, leaves 314A, 314B, and 316A are also coupled to additional similarity groups (not shown), also having at least four samples each.

As described above, an anonymizer trainer may train an anonymizer model using outputs from the trained machine learning model on the training data. In various examples, the anonymizer trainer may use a decision tree 300 to generate the anonymizer model. The anonymizer trainer may train the decision tree 300 using the predictions of the originally trained machine learning model. With a goal to achieve k-anonymity, the decision tree 300 may be built such that all leaves contain at least k samples. For example, a stopping condition may be used such that the anonymizer trainer stops building the decision tree once less than 2k−1 samples are present in a leaf. The decision tree 300 may be a set of conditions and the leaves may be samples from training data that meet all those conditions. The example decision tree 300 of FIG. 3 has been generated with a stopping condition that at least four data points exist for each leaf in the decision tree 300. Thus, the decision tree 300 may stop splitting as soon as the 2k−1 number is reached in a leaf.

In various examples, the generated groups 318-324 of leaves may form the basis for the generalization procedure described in various embodiments herein. For example, a representative value may be chosen for each quasi-identifier of each of the groups 318-324. In the example of FIG. 3, a representative for each group 318-324 may be chosen and the values of each representative used as the quasi-identifier (QI) values for each corresponding whole group 318-324. For example, the QI values in group 318 may be an income range of $20,000<income<$32,000 and an age range of 35<age<70. As one example, a representative may have an income of $30,000 and an age of 36. These values may thus be used for the group 318 for these QI values. In some examples, a mean value of each of the QI features for each group may be used. For example, for group 318 the mean QI values may thus be ($20,000+$32,000)/2=$26,000 for a first QI feature corresponding to income and (36+69)/2=52 for another QI feature corresponding to age. Generalized data may then be generated using these representative values in place of the original range or group of values. For example, any records of income between $20,000 and $32,000 mapped to this leaf may be replaced with the representative value of $26,000 and any values between 35 and 70 years of age may be replaced in the generalized data with the value 52. The rest of the features not corresponding to quasi-identifiers may remain unchanged. For example, additional non-quasi-identifier information such as price paid for a service or other information may be kept the same in the generalized data. The generalized data may then be used to retrain the machine learning model to generate an anonymized machine learning model. The resulting anonymized machine learning model may be able to receive the same input as the original machine learning model, and provide similar accuracy, while providing additional protection against various attacks. The resulting anonymized machine learning model may therefore be used in the same manner as the original machine learning model being anonymized.

It is to be understood that the block diagram of FIG. 3 is not intended to indicate that the decision tree 300 is to include all of the components shown in FIG. 3. Rather, the decision tree 300 can include fewer or additional components not illustrated in FIG. 3 (e.g., additional leaves, data points, etc.).

In some scenarios, the techniques described herein may be implemented in a cloud computing environment. As discussed in more detail below in reference to at least FIGS. 4-7, a computing device configured to anonymize machine learning models using accuracy-guided anonymization may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. In various examples, one or more components of the present techniques may be implemented in a cloud environment. For example, the anonymizer training and anonymizer model may be implemented in a local environment and the model retraining may be implemented in a cloud environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
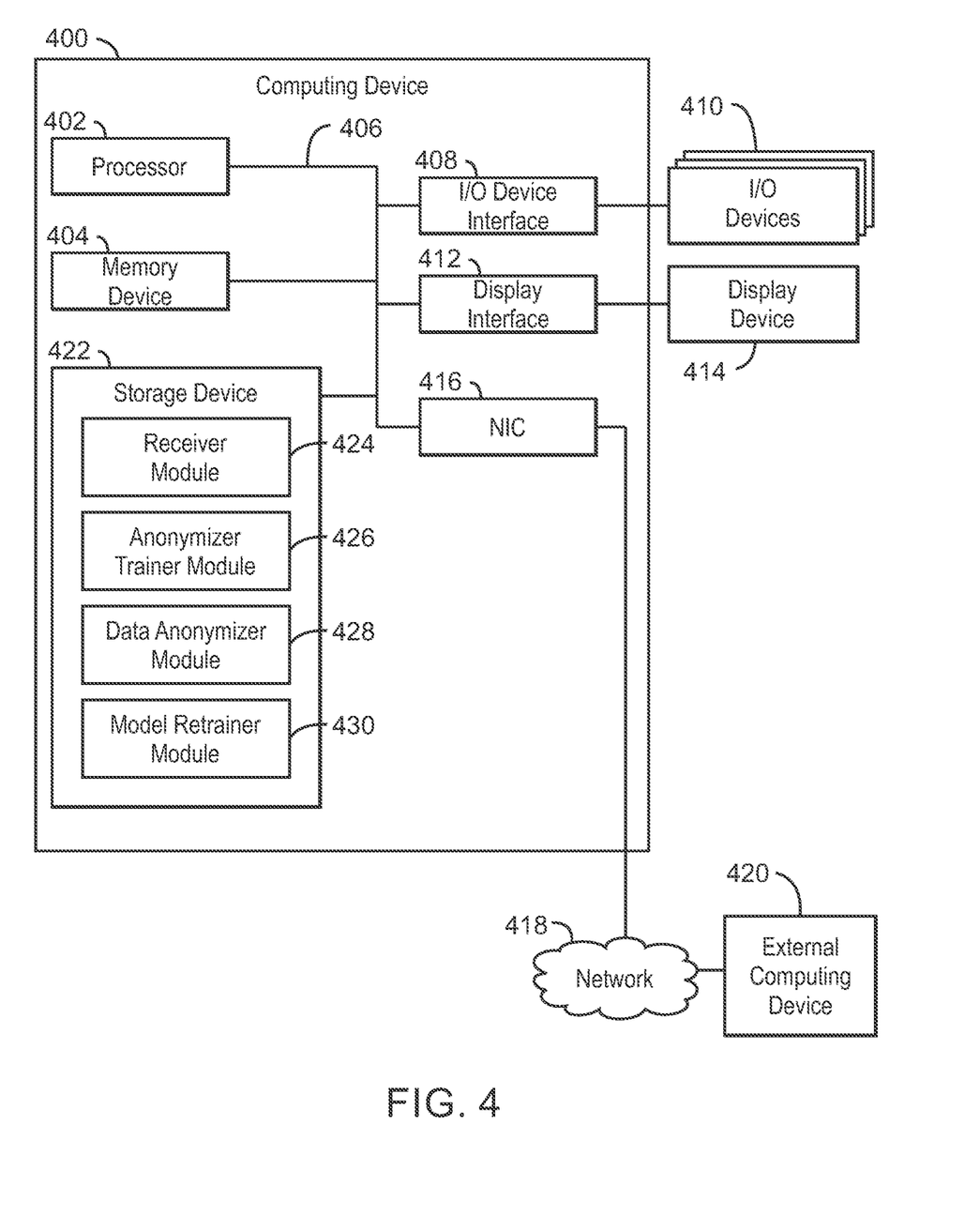
FIG. 4 is a block diagram of an example computing device that can anonymize machine learning models.

FIG. 4 is block diagram of an example computing device that can anonymize machine learning models. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, an anonymizer trainer module 426, a data anonymizer module 428, and a model retrainer module 430. The receiver module 424 can receive training data and predictions on the training data of a trained machine learning model to be anonymized. In some examples, the receiver module 424 can receive a trained machine learning model to be anonymized and training data. For example, the training data may include unlabeled data and the receiver module 424 can label the unlabeled data based on predictions of the trained machine learning model. In various examples, the predictions may include outputs from a layer of the trained machine learning model that is prior to a final classification layer. In some examples, the trained machine learning model may be a complex model. The anonymizer trainer module 426 can generate an anonymizer model based on the predictions of the trained machine learning model on the training data and generate the generalized data from the training data using the anonymizer model. For example, the anonymizer trainer module 426 can use the predictions of the trained machine learning model on the training data as input to generate groups of similar records based on similar outputs from the trained machine learning model and generalize the groups to generate an anonymizer model used to generate the generalized data. The data anonymizer module 428 can generate generalized data based on the predictions of the trained machine learning model on the training data. In various examples, the generalized data may be representative values in the same domain as original features used to train the anonymized machine learning model. The model retrainer module 430 can train an anonymized machine learning model using the generalized data. In some examples, the anonymized machine learning model may be an anonymized part of the complex model.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver module 424, the anonymizer trainer module 426, the data anonymizer module 428, and the model retrainer module 430 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, the anonymizer trainer module 426, the data anonymizer module 428, and the model retrainer module 430 can be implemented with logic, wherein the logic, as referred to herein, can include any suitable hardware (e.g., a processor, among others), software (e.g., an application, among others), firmware, or any suitable combination of hardware, software, and firmware.

Figure 5:
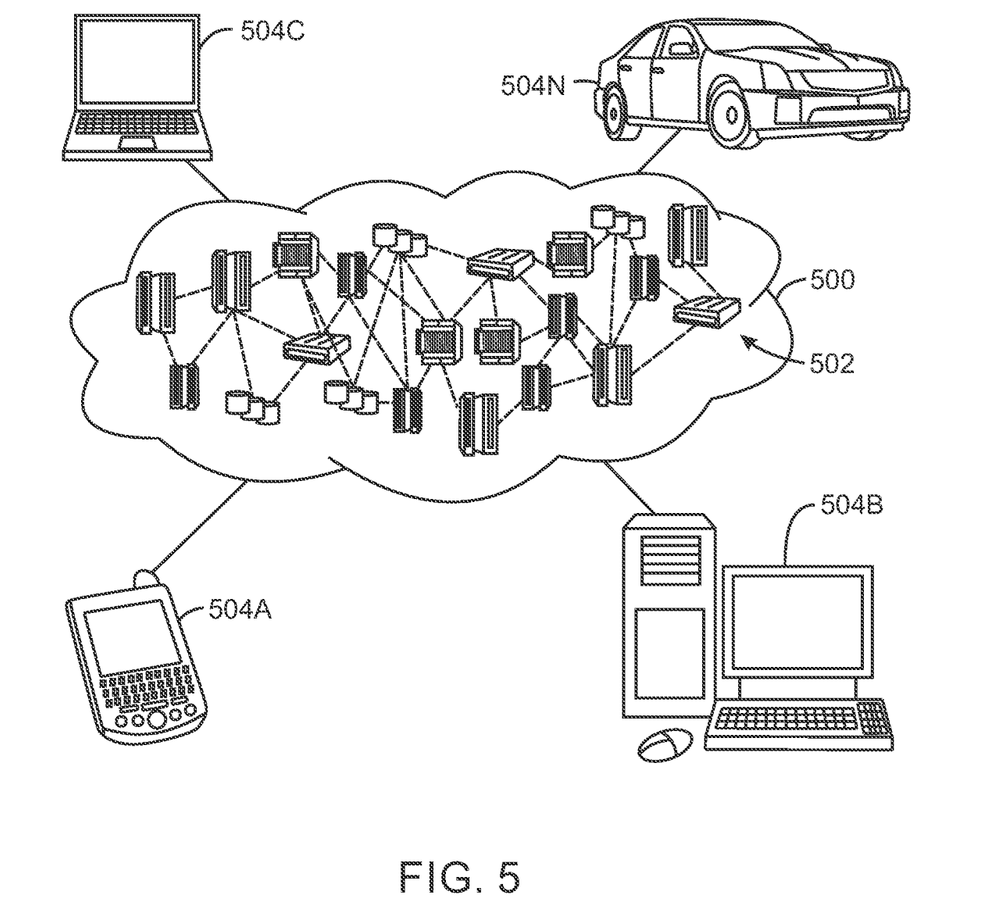
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
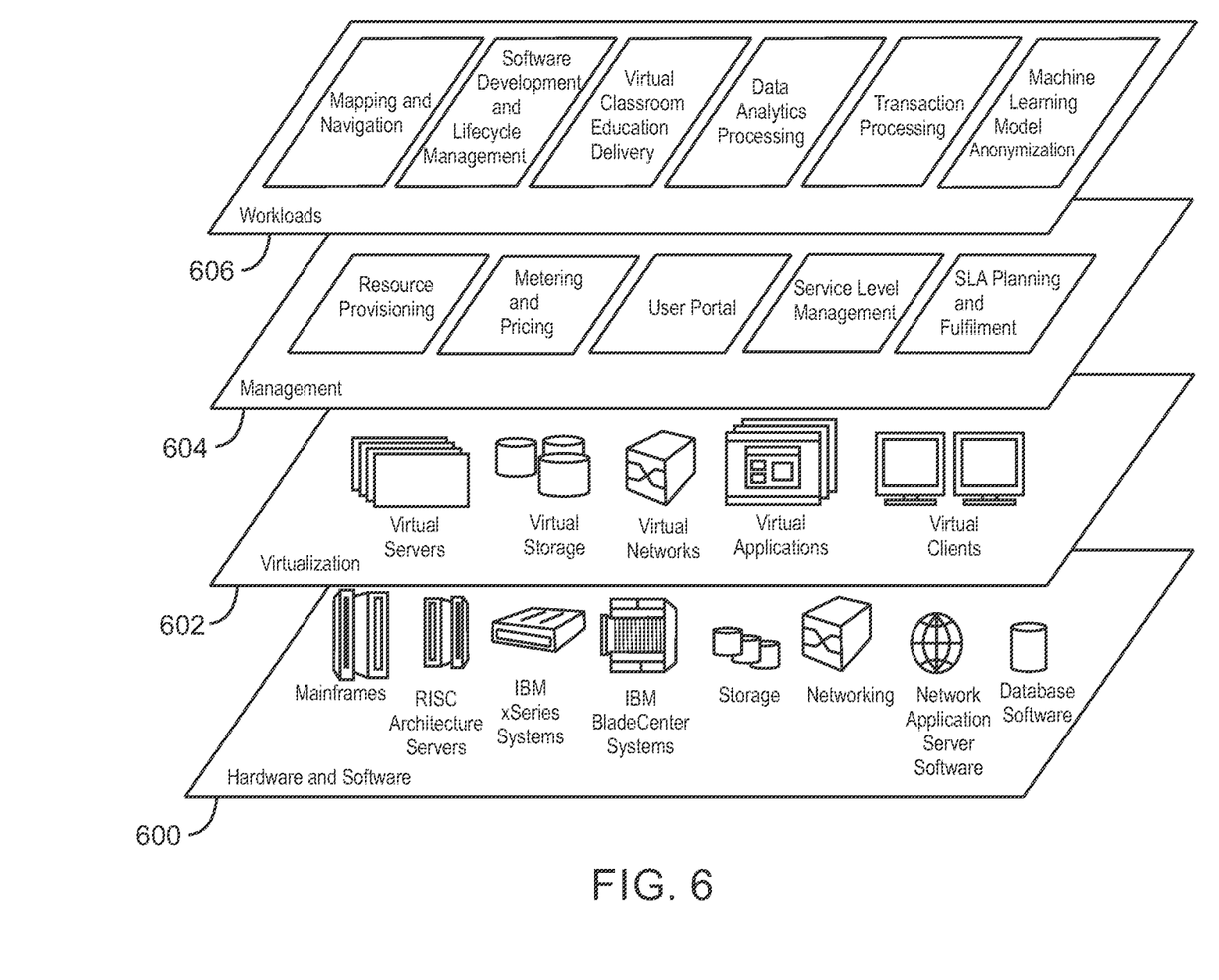
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and machine learning model anonymization.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
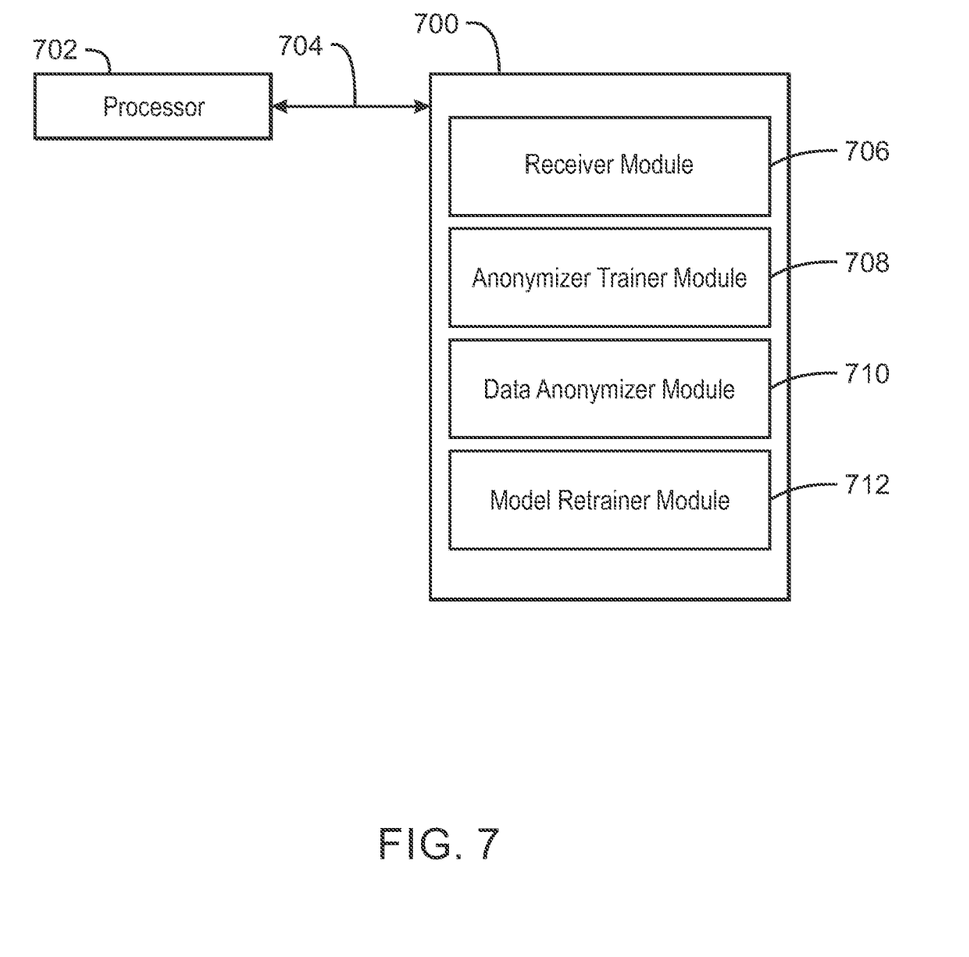
FIG. 7 is an example tangible, non-transitory computer-readable medium that can anonymize machine learning models.

Referring now to FIG. 7, a block diagram is depicted of an example tangible, non-transitory computer-readable medium 700 that can anonymize machine learning models. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 200 of FIG. 2.

The various software components discussed herein may be stored on the tangible, non-transitory, computer-readable medium 700, as indicated in FIG. 7. For example, a receiver module 706 includes code to receive training data and predictions on the training data of a trained machine learning model to be anonymized. In some examples, the receiver module 706 includes code to receive a trained machine learning model to be anonymized. In various examples, the training data may include labels or may not include labels. An anonymizer trainer module 708 includes code to generate an anonymizer model based on predictions of trained machine learning model on the training data. In various examples, the anonymizer trainer module 708 includes code to use the predictions of the trained machine learning model on the training data as input to generate groups of k similar records and generalize the groups to generate the anonymizer model. In some examples, the anonymizer trainer module 708 includes code to train a decision tree using predictions of the trained machine learning model. In some examples, the anonymizer trainer module 708 includes code to execute a two phase clustering algorithm including a coarse clustering phase and a sub-clustering phase. In some examples, the anonymizer trainer module 708 includes code to label the training data based on the predictions of the trained machine learning model. A data anonymizer module 710 includes code to anonymize the training data via the anonymizer model to generate generalized data. For example, the data anonymizer module 710 includes code to replace data points in each cluster or bucket of similar inputs with a representative value for the cluster or the bucket. A model retrainer module 712 includes code to retrain the trained machine learning model to generate an anonymized machine learning model.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
    receive training data and predictions on the training data of a trained machine learning model to be anonymized;
    generate generalized data based on the predictions of the trained machine learning model on the training data; and
    train an anonymized machine learning model using the generalized data.

2. The system of claim 1, wherein the processor is to generate an anonymizer model based on the predictions of the trained machine learning model on the training data and generate the generalized data from the training data using the anonymizer model.

3. The system of claim 1, wherein the processor is to use the predictions of the trained machine learning model on the training data as input to generate groups of similar records based on similar outputs from the trained machine learning model and generalize the groups to generate an anonymizer model used to generate the generalized data.

4. The system of claim 1, wherein the generalized data comprises representative values in the same domain as original features used to train the anonymized machine learning model.

5. The system of claim 1, wherein the training data comprises unlabeled data and the processor is to label the unlabeled data based on the predictions of the trained machine learning model.

6. The system of claim 1, wherein the predictions comprise outputs from a layer of the trained machine learning model that is prior to a final classification layer.

7. The system of claim 1, wherein the trained machine learning model comprises a complex model, and the anonymized machine learning model comprises an anonymized part of the complex model.

8. A computer-implemented method, comprising:
    receiving, via a processor, training data and predictions on the training data of a trained machine learning model to be anonymized;
    generating, via the processor, an anonymizer model based on the predictions of the trained machine learning model on the training data;
    anonymizing, via the processor, the training data via the anonymizer model to generate generalized data; and
    retraining, via the processor, the trained machine learning model using the generalized data to generate an anonymized machine learning model.

9. The computer-implemented method of claim 8, wherein generating the anonymizer model comprises training a decision tree using predictions of the trained machine learning model.

10. The computer-implemented method of claim 8, wherein generating the anonymizer model comprises using a two phase clustering algorithm comprising a coarse clustering phase and a sub-clustering phase.

11. The computer-implemented method of claim 8, wherein generating the anonymizer model comprises using the predictions of the trained machine learning model on the training data as input to generate groups of similar records and generalizing the groups to generate the anonymizer model.

12. The computer-implemented method of claim 8, wherein anonymizing the training data comprises replacing data points in each cluster or bucket of similar inputs with a representative value for the cluster or the bucket.

13. The computer-implemented method of claim 8, comprising receiving the trained machine learning model and generating the predictions, via the trained learning model, on the training data.

14. The computer-implemented method of claim 8, wherein retraining the trained machine learning model comprises retraining parts of the trained machine learning model, wherein the trained machine learning model comprises a complex model.

15. The computer-implemented method of claim 8, where the training data that is generalized for creating the anonymized machine learning model is different from the training data used to train the trained machine learning model.

16. A computer program product for anonymizing machine learning models, the computer program product comprising a computer-readable storage medium having program code embodied therewith, wherein the computer-readable storage medium is not a transitory signal per se, the program code executable by a processor to cause the processor to:
- receive training data and predictions on the training data of a trained machine learning model to be anonymized;
- generate an anonymizer model based on the predictions of the trained machine learning model on the training data;
- anonymize the training data via the anonymizer model to generate generalized data; and
- retrain the trained machine learning model using the generalized data to generate an anonymized machine learning model.

17. The computer program product of claim 16, further comprising program code executable by the processor to train a decision tree using predictions of the trained machine learning model.

18. The computer program product of claim 16, further comprising program code executable by the processor to execute a two phase clustering comprising a coarse clustering phase and a sub-clustering phase.

19. The computer program product of claim 16, further comprising program code executable by the processor to use the predictions of the trained machine learning model on the training data as input to generate groups of similar records and generalize the groups to generate the anonymizer model.

20. The computer program product of claim 16, further comprising program code executable by the processor to replace data points in each cluster or bucket of similar inputs with a representative value for the cluster or the bucket.

* * * * *